Figures 3, 4:
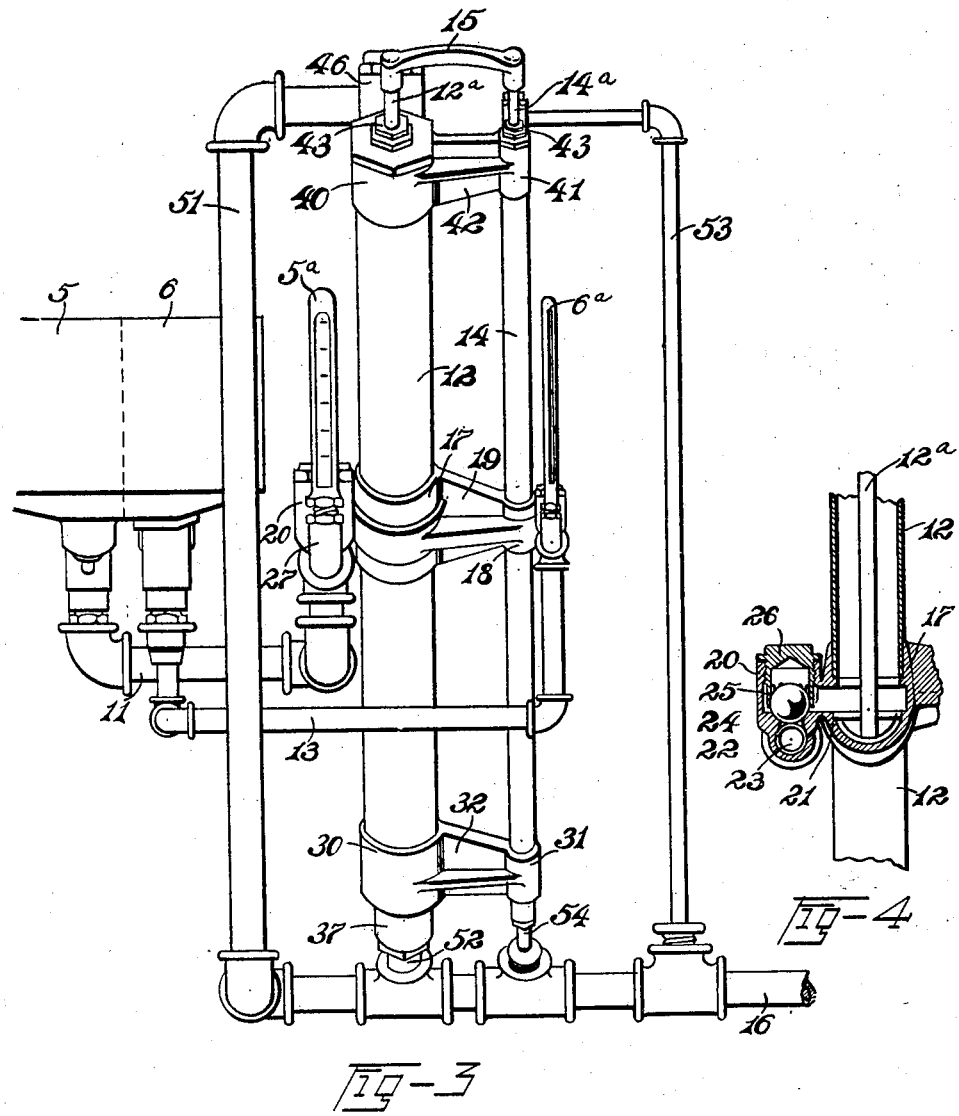

T. J. FAY.
FUEL SUPPLY SYSTEM FOR AUTOMOBILES.
APPLICATION FILED APR. 4, 1918.
1,325,318.
Patented Dec. 16, 1919.
2 SHEETS—SHEET 1.
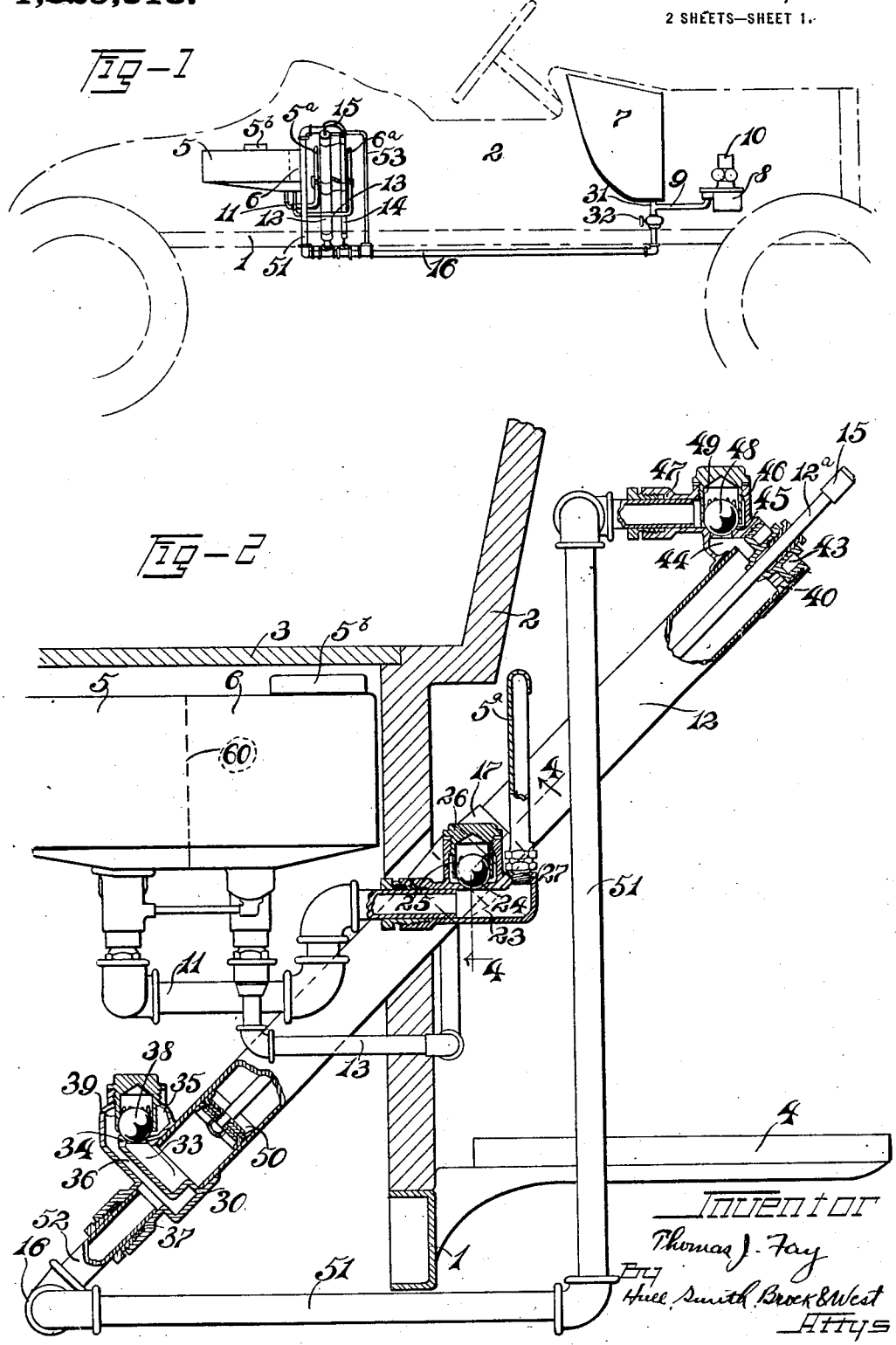
Inventor
Thomas J. Fay
By
Hull, Smith, Brock & West
Attys

T. J. FAY.
FUEL SUPPLY SYSTEM FOR AUTOMOBILES.
APPLICATION FILED APR. 4, 1918.

1,325,318.

Patented Dec. 16, 1919.
2 SHEETS—SHEET 2.

Inventor
Thomas J. Fay
By Hall, Smith, Brock & West
Attys

UNITED STATES PATENT OFFICE.

THOMAS J. FAY, OF BROOKLYN, NEW YORK, ASSIGNOR TO THE STANDARD PARTS COMPANY, OF CLEVELAND, OHIO, A CORPORATION OF OHIO.

FUEL-SUPPLY SYSTEM FOR AUTOMOBILES.

1,325,318.  Specification of Letters Patent.  Patented Dec. 16, 1919.

Original application filed August 25, 1915, Serial No. 47,380. Divided and this application filed April 4, 1918. Serial No. 226,743.

*To all whom it may concern:*

Be it known that I, THOMAS J. FAY, a citizen of the United States, residing at Brooklyn, in the county of Kings and State of New York, have invented a certain new and useful Improvement in Fuel-Supply Systems for Automobiles, of which the following is a full, clear, and exact description, reference being had to the accompanying drawings.

This invention relates to systems for supplying fuel to the internal combustion engine of an automobile, this application being a division of my former application filed August 25, 1915, Serial No. 47,380. The objects of the invention are the provision of a system whereby two different hydrocarbons may be safely and separately stored and transported in containers suitably located with respect to the vehicle, and whereby the same may be suitably mixed and supplied in predetermined portions to the engine cylinder or cylinders, the hydrocarbons preferably consisting of fuels of different grades; the provision of an installation of this nature for motor vehicles which is safe, simple and reliable; while further objects of the invention will appear hereinafter.

For purposes of illustration but not of limitation I have illustrated one of the many possible embodiments of my invention in the drawings accompanying and forming a part of this application, wherein Figure 1 is a diagrammatic side elevation of a portion of an automobile having my system applied thereto; Fig. 2 is an enlarged detail of the system, partly in section and partly in elevation, a portion of the automobile frame and body being shown in transverse section; Fig. 3 represents an elevation of the part of the system illustrated in Fig. 2, the parts of the automobile being omitted for clearness of illustration; and Fig. 4 is a sectional detail corresponding to the line 4—4 of Fig. 2.

Describing by reference characters the various parts illustrated herein, 1 denotes a side frame, 2 the body, 3 the seat bottom and 4 the running board of an automobile of ordinary or standard construction. 5 and 6 denote the storage tanks which are located in the rear part of the automobile where they will be removed from the heat of the engine, the two being here shown as located closely adjacent to each other, 5 representing the main fuel tank, and 6 a tank for modifying hydrocarbon. These tanks are preferably provided with suitable gages $5^a$ and $6^a$ respectively, whereby the operator may determine by inspection the quantity of liquid in each. It is intended that the liquids within the tanks 5 and 6 shall be supplied in the desired proportions to a tank 7 located at any suitable point in the car arranged to deliver directly to a point of use; I have here shown this tank as separate from the carbureter and located behind the engine and in front of the dash. The tank illustrated supplies a carbureter 8 through a suitable connection 9, and from the carbureter there extends the supply pipe 10 through which the mixture is fed to the engine (not shown). Obviously my invention is independent of the construction or nature of the carbureter, and the mixed liquids can, if desired, be delivered to the inlet pipe directly by means of any suitable spray nozzle or (and this is the same thing) the tank 7 may itself constitute the float feed chamber of the carbureter. The only purpose of a tank 7 is to form a storage chamber and thus dispense with continuous operation of the pump which is desirable in case that pump be manually operated, though if the pump be mechanically driven the size of the tank 7 may be correspondingly decreased; and this tank ought in no case to be unnecessarily large since this would lead to the mixing together of the hydrocarbons in too great quantities, thus permitting segregation or selective evaporation. This is the main reason for mixing the liquids only upon the eve of their use.

The storage tanks are provided with the usual filling openings covered with removable caps, that for the tank 6 being indicated at $5^b$. This tank communicates by means of a pipe 11 with a pump 12, while the tank 6 communicates by means of the pipe 13 with a pump 14, said pumps being arranged to be operated simultaneously, as by having their piston rods $12^a$ and $14^a$ secured to the same handle 15 and having their discharge ends connected to the same conduit 16, whereby the liquid is delivered to the tank 7. These pumps are here shown as adapted for manual operation and as located in easy reach from the driver's seat, although I do not confine myself either to this location or to manual operation except in the few claims where these things are specifically recited.

In the embodiment here illustrated I provide twin sleeves 17, 18 connected by a web 19, the pump 12 consisting of two separate barrels inserted in opposite ends of the sleeve 17, and the pump 14 consisting of two separate barrels inserted in opposite ends of the sleeve 18. The sleeve 17 is formed at one side with a hollow boss 20 communicating with the interior of the pump by means of a bore 21 and having a circular seat 22 in its lower portion communicating with a chamber 23 which receives the pipe 11. A ball valve 24 rests on this seat and normally closes the same, being guided in its movements by a suitable cage 25 carried by the cover 26. I have shown the forward end of the chamber 23 as provided with an extension 27 which carries the fluid gage $5^a$, thus supporting the same at a convenient point for observation.

I have shown the lower ends of the pump barrels as received in twin couplings 30—31 connected by a web 32. The interior of the coupling 30 communicates by means of a passageway 33 with a valve seat 34 formed at the bottom of a hollow boss 35 which in turn communicates by means of the passageway 36 with the coupling 37. The valve seat 34 is shown as governed by a ball valve 38 guided in a cage 39 in the same manner as before.

The upper ends of the pump barrels are shown as received in twin couplings 40—41 connected by the web 42 and formed with stuffing boxes 43—43 for the passage of the piston rods $12^a$ and $14^a$. The interior of the coupling 40 communicates by means of a passage 44 with a valve seat 45 formed at the bottom of a hollow boss 46 which in turn communicates with the coupling 47. In the present embodiment this valve seat is shown as governed by a ball valve 48 guided by the cage 49 as before. The piston rod $12^a$ is provided with a suitable piston 50, while the couplings 37 and 47 are connected to the pipe 16 by means of the pipes 51 and 52, respectively. The construction of the pump 14 is preferably similar in all respects to that of the pump 12, and its ends are connected to the same pipe 16 by means of the pipes 53 and 54 respectively.

In the present embodiment the pumps are shown as having cross-sectional areas bearing the same relation to each other as the desired proportions of the fluids, which is the simplest, though clearly not the only mode of securing a mixture of the two liquids in the proportions desired. I have also shown the two tanks as contained in the same casing but separated from each other by the partition 60, although this arrangement is merely illustrative.

It is a well known fact that the evaporation of a volatile liquid when subjected to heat will generally be much slower when mixed with a less volatile liquid than when it is pure; which fact is availed of in the present construction by mixing the two liquids in the common pipe 16 leading to the tank 7 rather than by introducing the more volatile liquid separately into the warm space near the engine. The location of the pump devices at a distance from the engine is also advantageous.

It will be obvious that the arrangement illustrated is only one of the many arrangements which could be adopted to the end in view, wherefore I do not limit myself to the constructions, arrangements, or modes of operation herein described except as the same are specifically recited in the claims hereto annexed.

Having thus described my invention, what I claim is:—

1. In a device of the character described, the combination, with a self-propelled road vehicle having an internal combustion engine at its forward end, of a pair of storage tanks carried by the rear part of said vehicle, a third tank located adjacent to said engine and connected to the engine mixture supply pipe, and means for transferring liquids from said storage tanks in predetermined proportions to said third tank.

2. In a device of the character described, the combination, with a self-propelled road vehicle having an internal combustion engine at its forward end, of a pair of storage tanks carried by the rear part of said vehicle, a third tank located adjacent to said engine and connected to the engine mixture supply pipe, a pair of pumps of different capacity, each of said pumps having its inlet connected to one of said storage tanks and its outlet connected to said third tank, and means for operating said pumps simultaneously.

3. In a device of the character described, the combination, with an automobile having an engine at its forward end, of a pair of storage tanks carried by a portion of said automobile removed from the heat of said engine, a pair of pumps carried by said automobile at a point also removed from the heat of said engine, one of said pumps being connected to each storage tank, a third tank located adjacent to said engine and adapted to receive the discharge from both pumps, means for operating said pumps, and means connecting said third tank to the engine mixture supply pipe.

4. In a device of the character described, the combination, with an automobile having an engine at its forward end, of a pair of storage tanks carried by a portion of said automobile removed from the heat of said engine, a third tank located adjacent to said engine and connected to the mixture supply pipe, and a pair of pumps carried by said automobile in convenient reach from the driver's seat, one of said pumps having its inlet connected to each of said storage tanks and both pumps having their outlets communicating with said third tank.

5. In a device of the character described, the combination, with an automobile having an engine at its forward end, of a pair of storage tanks carried by a portion of said automobile removed from the heat of said engine, a third tank located adjacent to said engine and connected to the mixture inlet pipe, a supply pipe leading to said third tank and a pair of pumps carried by said automobile at a point removed from the engine with their outlets connected to said supply pipe, one of said pumps being connected to each storage tank.

6. In a device of the character described, the combination, with an automobile having an engine at its forward end, of a pair of storage tanks carried by a portion of said automobile removed from the heat of said engine, a third tank located adjacent to said engine and connected to the mixture inlet pipe, a supply pipe leading to said third tank and means located in convenient reach of the driver's seat for controlling the supply of liquid from said storage tanks to said supply pipe.

In testimony whereof I hereunto affix my signature.

THOMAS J. FAY.